2,977,341

POLYMERS OF VINYL PYRIDINIUM BETAINES

Walter H. Schuller and John A. Price, Stamford, Conn., assignors to American Cyanamid Company, New York, N.Y., a corporation of Maine No Drawing. Filed Apr. 13, 1955, Ser. No. 501,196

3 Claims. (Cl. 260—78)

This invention relates to new chemical compounds and compositions, and more particularly to new unsaturated pyridinium compounds and to polymerization products thereof, including both homopolymers and copolymers of the new unsaturated pyridinium compounds. The scope of the invention also includes method features.

More particularly the present invention is directed to a new class of compounds embraced by the general formula

I

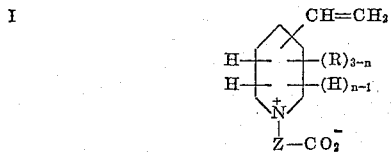

wherein R represents an alkyl radical containing from 1 to 5 carbon atoms, inclusive, Z represents an alkylene radical, and n represents an integer from 1 to 3, inclusive; and to homopolymers and copolymers of compounds of the aforementioned class, which compounds may be designated more specifically as "betaines." Our invention also embraces polymerizable compositions comprising (1) a compound of the class covered by Formula I and (2) a compound which is different from the compound of (1), which is copolymerizable therewith and which contains a $CH_2=C<$ grouping; as well as products comprising a copolymer obtained by polymerization of the polymerizable compositions just described.

Illustrative examples of alkyl radicals represented by R in the above formula are methyl, ethyl, propyl, isopropyl, butyl, isobutyl, sec.-butyl, tert.-butyl, amyl, isoamyl, etc. Illustrative examples of alkylene radicals represented by Z are: methylene, ethylene, propylene, butylene, isobutylene, pentylene, isopentylene, hexylene to octadecylene, inclusive. The alkylene radical represented by Z can be either straight or branched chain. Preferably Z represents an alkylene radical containing from 1 to 4 carbon atoms, inclusive.

Sub-classes of compounds embraced by Formula I are: the monovinyl 1-carboxyalkylpyridinium betaines; the mono-(lower alkyl) monovinyl 1-carboxyalkylpyridinium betaines; and the di-(lower alkyl) monovinyl 1-carboxyalkylpyridinium betaines. More specific examples include:

1-carboxymethyl-2-vinylpyridinium betaine
1-carboxyethyl-3-vinylpyridinium betaine
1-carboxymethyl-4-vinylpyridinium betaine
1-carboxymethyl-2-methyl-5-vinylpyridinium betaine
1-carboxyethyl-2-methyl-5-vinylpyridinium betaine
1-carboxymethyl-4-methyl-3-vinylpyridinium betaine
1-carboxymethyl-5-ethyl-2-vinylpyridinium betaine
1-carboxypropyl-5-methyl-3-vinylpyridinium betaine
1-carboxybutyl-3-methyl-2-vinylpyridinium betaine
1-carboxyethyl-4-methyl-2-vinylpyridinium betaine
1-carboxyethyl-5-ethyl-2-vinylpyridinium betaine
1-carboxymethyl-4,6-dimethyl-2-vinylpyridinium betaine
1-carboxyethyl-4,6-diethyl-2-vinylpyridinium betaine.

Other examples will be apparent to those skilled in the art from Formula I and from the illustrative examples hereinbefore given of radicals represented by R and Z, and from the definition of n.

It is an object of the present invention to provide a new class of unsaturated betaines of the kind embraced by Formula I, and polymerization products thereof.

Another object of the present invention is to provide a new class of polymerizable compositions containing (1) a compound of the kind embraced by Formula I (or a plurality of such compounds) and (2) one or more other comonomers copolymerizable therewith, and a new class of copolymer compositions from the said polymerizable compositions.

Another object of the invention is to provide a new class of synthetic compositions, more particularly resinous polymers and copolymers, which are especially suitable for use in the plastics, coating, adhesive, laminating, molding and other arts.

Another object of the invention is the production of new copolymers, more particularly new acrylonitrile copolymer compositions, which are more readily dyed, especially with acid dyes, than homopolymeric acrylonitrile or many of the copolymers of acrylonitrile and another monomer or monomers that were known or suggested prior to our invention.

Another object of the invention is to prepare such acrylonitrile copolymers which can be spun or otherwise shaped to form filaments, tapes, ribbons, tubes, rods, sheets, etc., and the shaped articles then dyed either before or after having been oriented or treated to improve their useful properties.

Still other objects of the invention will be apparent to those skilled in the art from the description and examples which follow.

These objects are accomplished, in general, by preparing a betaine of the kind embraced by Formula I and, when desired, polymerizing this compound alone or, preferably, while admixed with another substance which is copolymerizable therewith. The polymerization product advantageously is prepared by polymerizing the polymerizable substance including the aforementioned betaine in an aqueous medium with the aid of a polymerization catalyst, and recovering the resulting polymeric product by any suitable means, e.g., by filtration, centrifuging, etc. The polymers (homopolymers and copolymers) are ionic in nature, differing from the ordinary ionic polymer in that they contain both anionic and cationic groupings attached to the polymer chain. It is believed that, at a pH between 1 and 13, neither the anionic nor the cationic grouping is appreciably associated, meaning that the polymer is essentially an internally- neutralized, polymeric salt, the net charge on which should not be influenced by pH within the range stated above.

Any suitable method can be used in preparing the unsaturated betaines embraced by Formula I and which are used in producing the homopolymeric and copolymeric compositions. They can be prepared, for example, by reacting, in an aqueous medium, a vinylpyridine represented by the general formula

II

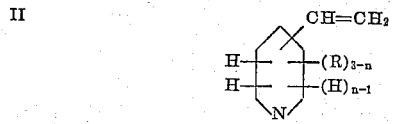

wherein R represents an alkyl radical containing from 1 to 5 carbon atoms, inclusive, and n represents an integer from 1 to 3, inclusive, with an alkali-metal salt (e.g., a sodium, potassium, lithium, etc., salt) of a halogenated carboxylic acid represented by the general formula III 

wherein X represents a halogen selected from the class consisting of chlorine and bromine, and Z represents an alkylene radical (numerous examples of which have been given above), preferably an alkylene radical containing from 1 to 4 carbon atoms, inclusive. The reaction is preferably effected under neutral or alkaline conditions (e.g., at a pH of from 7.0 to about 10.0) and at a temperature of from about 15–20° C. to about 90–100° C. In general, it is advantageous to employ a molar excess (e.g., a 100% molar excess) of the vinylpyridine. This will result in a higher conversion of the halogenated acid to the betaine. The unreacted vinylpyridine can then be extracted easily from the aqueous solution of the product. The yield of betaine is almost quantitative.

Illustrative examples of vinylpyridines embraced by Formula II that can be employed in preparing the betaines of this invention include vinylpyridines represented by the formula

IV

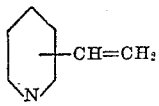

and which include 2-vinylpyridine, 3-vinylpyridine and 4-vinylpyridine; and methyl vinylpyridines represented by the formula

V

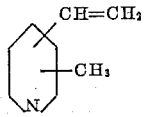

and which include 2-methyl-3-vinylpyridine, 3-vinyl-4-methylpyridine, 3-vinyl-5-methylpyridine, 2-vinyl-3-methylpyridine, 2-vinyl-4-methylpyridine, 2-vinyl-5-methylpyridine, 2-vinyl-6-methylpyridine, 2-methyl-4-vinylpyridine, 2-methyl-5-vinylpyridine, and 3-methyl-4-vinylpyridine. The vinylpyridines embraced by Formula V are a preferred sub-group within a broader class of vinylpyridines that are advantageously employed in making the betaines of the present invention and which may be represented by the formula

VI

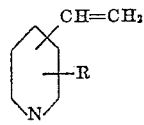

and wherein R represents a lower alkyl radical, more particularly a methyl, ethyl, propyl (including n-propyl and isopropyl), butyl (including n-butyl, isobutyl, sec.-butyl and tert.-butyl) or amyl (including normal and the various amyl) radical. Other examples include 2-vinyl-4,6-dimethylpyridine, 2-vinyl-4,6-diethylpyridine and others embraced by Formula II.

Illustrative examples of alkali-metal salts of halogenated saturated monocarboxylic acids embraced by Formula III that can be used in producing the betaine are the alkali-metal salts, e.g., the sodium salts, of the following acids:

Chloroacetic
Bromoacetic
Alpha-bromopropionic
Beta-bromopropionic
Alpha-chloropropionic
Beta-chloropropionic
Alpha-bromobutyric
Beta-bromobutyric
Alpha-bromovaleric and other mono-chloro- and mono-bromo-monocarboxylic acids containing, for instance, from 6 to 18 carbon atoms, inclusive.

Any suitable means may be used in effecting polymerization of the unsaturated betaine of this invention alone or admixed with one or more other substances which are copolymerizable therewith. Heat, light, or both heat and light, with or without a polymerization catalyst can be used. A polymerization catalyst preferably is employed in order to shorten the period of time required for polymerization.

Any of the polymerization catalysts which are suitable for use in polymerizing compounds containing an ethylenically unsaturated grouping, specifically a vinyl grouping, can be employed. Among such catalysts are the various organic peroxy catalysts, illustrative examples of which latter are: the dialkyl peroxides, e.g., diethyl peroxide, dipropyl peroxide, dibutyl peroxide, dilauryl peroxide, dioleyl peroxide, distearyl peroxide, di-(tert.-butyl) peroxide and di-(tert.-amyl) peroxide; the alkyl hydrogen peroxides, e.g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e.g., coconut oil acid peroxides, etc.; unsymmetrical or mixed diacyl peroxides, e.g., acetyl benzoyl peroxide, propionyl benzoyl peroxide, etc.; terpene oxides, e.g., ascaridole, etc.; and salts of inorganic per-compounds, examples of which are given hereinafter. Other so-called "free radical" types of catalysts, e.g., $\alpha,\alpha'$-azodiisobutyronitrile, also cane be used to accelerate polymerization. The various known "redox" (reduction-oxidation) catalyst systems also can be employed, and are especially adapted for use when the polymerizable substance (monomer alone or admixed with another polymerizable substance) is polymerized in an aqueous medium. Such water-soluble catalyst systems generally comprise a water-soluble catalyst or catalysts and a water-soluble activator. Illustrating examples of water-soluble catalysts are water-soluble, oxygen-yielding peroxy compounds, e.g., the water-soluble peroxides, peracids and persalts, including hydrogen peroxide, organic peroxides, e.g., diacetyl peroxide, urea peroxide, etc., peracetic acid, the various water-soluble perchlorates, persulfates, percarbonates, perborates, perphosphates, etc., e.g., the ammonium and alkali-metal (sodium, potassium, lithium, etc.) salts of percarbonic, peracetic, perboric, perphosphoric, persulfuric, perchloric, etc., acids; water-soluble chlorates, e.g., ammonium, sodium and potassium chlorates, etc.; water-soluble ferric salts capable of yielding ferric ions, including the various ferric alums, e.g., ferric ammonium sulfate (ferric ammonium alum), ferric sodium sulfate, ferric potassium sulfate, etc. Other examples of water-soluble additives comprising a water-soluble catalyst that may be used in producing the polymers (homopolymers and copolymers) of the present invention are given in, for instance, U.S. Patents 2,289,540, 2,380,474, –5, –6, –7, 2,380,617, –8, 2,380,710, 2,383,-425, 2,384,544, 2,384,571, 2,384,574, 2,388,373 and 2,395,017.

Illustrative examples of water-soluble activators (water-soluble polymerization adjuvants) of the catalyst are oxygen-containing sulfur compounds which are capable of undergoing oxidation, for instance sulfur dioxide, the alkali-metal (e.g., sodium, potassium, etc.) bisulfites, hydrosulfites, thiosulfates, sulfurous acid (or compounds which engender sulfurous acid, e.g., alkali-metal sulfites, ethyl and other alkyl sulfites, etc.), various organic sulfinic acids, e.g., p-toluene sulfinic acid, formamidine sulfinic acid, etc. If alkali-metal sulfites, e.g., sodium sulfite, or similar compounds which engender sulfurous acid are used, the aqueous solution also should contain a strong acid, e.g., sulfuric acid, etc., in an amount which is at least chemically equivalent to the amount of such a compound engendering sulfurous acid that is employed.

If desired, the polymerizable substance can be polymerized in emulsion or in solution state to yield a polymer. Good results are obtained by effecting polymerization while the polymerizable material is dissolved in a suitable solvent, preferably water or a liquid solvent comprising mainly water. Suitable inert organic solvents can be used if desired, e.g., benzene, toluene, xylene, etc. Preferably the polymerization reaction is carried out in a liquid medium in which the polymerizable substance is soluble but the polymer is insoluble, e.g., water.

The polymerization also can be effected by conventional bulk polymerization technique, in the presence or absence of a solvent capable of dissolving the polymerizable material and in which the latter preferably is inert; or by conventional bead polymerization methods. The polymerization of the polymerizable substance can be effected by a continuous process as well as by a batch operation.

The concentration of the catalyst is relatively small, e.g., from, by weight, about 1 part of catalyst per 1,000 parts of the polymerizable material to about 4 or 5 parts of catalyst per 100 parts of the said material. The amount of polymerization adjuvant or activator used likewise may be varied considerably, but generally is within the range of from about 0.1 to 1 molar proportion based on the catalyst used or an amount which is chemically equivalent to the amount of catalyst employed. The use of higher ratios of activator with respect to the catalyst is not precluded, e.g., 2 or 3 or more moles of activator per mole of catlayst, or correspondingly larger proportions on a chemical equivalent basis, but no particular advantages ordinarily accrue therefrom.

Forms of radiation other than ultraviolet or visible light may also be used to initiate polymerization. Examples of such types of radiation are high-energy particles (e.g., high-energy electrons), X-rays and gamma radiation. Cobalt-60 is a convenient source of gamma radiation. In all of these cases polymerization may be initiated either by direct effect of radiation on the polymerizable substance or indirectly (if a solvent or other substance is present) by the action of radicals resulting from irradiation of these substances.

The polymerization reaction may be effected, if desired, while the aqueous medium is maintained under an atmosphere of an inert gas, for example nitrogen, helium, carbon dioxide, etc.; or, it may be (but preferably is not) carried out under an atmosphere of air.

The temperature at which the polymerizable material is polymerized can be varied over a wide range, up to and including or slightly above the boiling point (at atmospheric pressure) of the monomer or mixture of polymerizable substances. In most cases, the polymerization temperature will be within the range of about 20° or 30° C., preferably at least 35° or 40° C., up to the boiling temperature of the polymerizable material, depending, for example, upon the particular catalyst, if any, used, the rapidity of polymerization wanted and other influencing factors. The use of polymerization temperatures substantially above the boiling point of the monomer or mixture of polymerizable substances is not precluded, but generally is less desirable because the polymerization reaction then must either be carried out in a closed reaction vessel under pressure, or, for economical reasons, with a reflux condenser or other means provided for the recovery and re-use of the volatilized monomer or monomers if the reaction is carried out at the boiling temperature of the mass under atmospheric pressure.

The polymers of this invention can be produced in various molecular weights as desired or as conditions may require. Thus, the fiber-forming copolymers, more particularly the fiber-forming acrylonitrile copolymers, ordinarily are within the range of about 15,000 to about 300,000 or higher as calculated from viscosity measurements using the Staudinger equation (reference: U.S. Patent No. 2,404,713). Homogeneous acrylonitrile copolymers having an average molecular weight of between about 60,000 and 90,000 and which contain at least 70%, advantageously from about 80% to about 95% of acrylonitrile (combined acrylonitrile) in the molecule, are especially suitable for use in making dyeable, oriented fibers by wet- or dry-spinning methods.

If the polymerization reaction is carried out while the polymerizable material is dissolved or dispersed in a liquid medium, e.g., in solution in water, the resulting polymer then is separated from the said medium by any suitable means, e.g., by filtration, centrifuging, solvent extraction, etc.

The unsaturated betaine may be used alone in various detergent, germicidal, fungicidal, antistatic, plastics, and other applications. The homopolymer is also useful in many aplications, e.g., as a modifier of a polymer of acrylonitrile to improve its dyeability, especially with acid dyes. Or, in order to modify the properties of the unsaturated betaine and to widen the field of utility, it can be copolymerized with other substances which are different therefrom and copolymerizable therewith, e.g., compounds containing a $CH_2=C<$ grouping which are different from the unsaturated betaine; unsaturated alkyd resins; mixtures of individual members of either or both of these classes of polymerizable unsaturated materials; as well as other copolymerizable substances.

Illustrative examples of substances that can be copolymerized with a betaine of the kind embraced by Formula I are vinyl compounds, including the vinyl and isopropenyl aromatic compounds, more particularly the vinyl and isopropenyl aromatic hydrocarbons (e.g., styrene, isopropenyl toluene, the various dialkyl styrenes, etc.), other aliphatic compounds containing a $CH_2=C<$ grouping, e.g., acrylonitrile and the various substituted acrylonitriles (e.g., methacrylonitrile, ethacrylonitrile, phenylacrylonitrile, etc.), the various acrylamides (e.g., acrylamide itself, methacrylamide, ethacrylamide, the N-monoalkyl and -dialkyl acrylamides and methacrylamides, e.g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e.g., N-monophenyl and -diphenyl acrylamides and methacrylamides, the various N-β-hydroxyethyl acrylamides, etc.), vinyl esters, e.g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e.g., methacrylic acid, ethacrylic acid, phenylacrylic acid, etc.), more particularly the alkyl esters of an acrylic acid, e.g., the ethyl, propyl, isopropyl, n-butyl, isobutyl, sec.-butyl, tert.-butyl, amyl, hexyl, heptyl, octyl, decyl, dodecyl, etc., esters of arcrylic, methacrylic, ethacrylic, phenylacrylic, etc., acids including the alkyl acrylates containing not more than four carbon atoms in the alkyl grouping, examples of which are given above, as well as other vinyl aromatic and vinyl aliphatic compounds, and other compounds containing a $CH_2=C<$ grouping, more particularly a single $CH_2=C<$ grouping.

Other examples of copolymerizable substances that can be employed alone or in conjunction with one or more compounds containing a $CH_2=C<$ grouping include the polymerizable unsaturated alkyd resins (modified or unmcdified), e.g., ethylene glycol maleate, diethylene glycol maleate phthalate, ethylene glycol maleate succinate and diethylene glycol maleate linoleate. Other and more specific examples of unsaturated alkyd resins that can be used are given, for example, in Nyquist and Kropa Patent No. 2,503,209, dated April 4, 1950, and patents referred to therein (see, for instance, column 8, lines 1–64).

Still other examples of materials that can be copolymerized with the unsaturated betaine of the kind embraced by Formula I are given in Kropa Patent No. 2,510,503 (e.g., column 2, line 46, to the end of the sentence in line 16, column 3; column 5, line 54, through line 46, column 7; and column 13, line 42, through line 30, column 16); and in the aforesaid Nyquist et al.

Patent No. 2,503,209 (see, for instance, column 5, line 67, through line 75, column 7; and column 9, line 74, through line 12, column 11).

The proportions of the unsaturated betaine and different unsaturated material which is copolymerizable therewith may be widely varied depending, for instance, upon the particular starting materials employed and the particular properties desired in the copolymer, e.g., in weight ratios of from 1:99 to 99:1, and more particularly from 5:95 to 95:5. Mainly for economical reasons, it is usually desirable that the unsaturated betaine does not exceed about 50% by weight of the total monomers. For example, we may use advantageously from about 1% to about 40% of the betaine and from about 60% to about 99% of the other copolymerizable substance or substances, e.g., a different vinyl compound or compounds, and more specifically acrylonitrile, in producing new and valuable copolymer compositions. The percentages just mentioned are by weight.

Our invention has particular utility in preparing improved acrylonitrile copolymers. In making such copolymers, the proportions of any modifying comonomer or comonomers that are incorporated in the polymerizable composition together with the acrylonitrile and the betaine of the kind embraced by Formula I can be varied as desired or as conditions may require. Ordinarily, however, the acrylonitrile constitutes a major or preponderant proportion (more than 50%) by weight of the total weight of monomers to be copolymerized, the betaine constitutes from about 1–3% to about 15–20%, or in some cases as high as 25 or 30%, of the total weight of the acrylonitrile and betaine, and any modifying comonomer or comonomers (if present in the polymerizable mixture) constitute the remainder of the total amount of copolymerizable ingredients which are subjected to copolymerization.

In the preferred acrylonitrile copolymer compositions (more particularly thermoplastic acrylonitrile copolymer compositions) of the present invention, the acrylonitrile is employed in the mixture of comonomers in an amount such that at least about 85% by weight of combined acrylonitrile is present in the copolymer.

In order that those skilled in the art may better understand how the present invention can be carried into effect the following examples are given by way of illustration and not by way of limitation. All parts and percentages are by weight.

EXAMPLE 1

*Preparation of 1-carboxymethyl-2-methyl-5-vinylpyridinium betaine*

To a flask equipped with a stirrer, thermometer and ice bath are added 69.5 parts of bromoacetic acid and 250 parts of water. To this solution are slowly added, over a period of 15 minutes, 19.95 parts of sodium hydroxide as a 10% aqueous solution at a temperature of 16–18° C. The last 5% of this solution is added, using a pH meter, to a final pH of 7.0. To this solution are added 119 parts of 2-methyl-5-vinylpyridine and 200 parts of acetone. The clear solution is allowed to stand at room temperature for 20 hours. It is then heated on a steam bath for 3 hours. The solution is cooled to room temperature and an additional 100 parts of water are added. A 0.04% aliquot requires 0.19 meq. (milliequivalent) of silver nitrate to the Mohr endpoint, indicating that the quaternarization is 95% complete. The solution is made alkaline by the addition of 1 part of sodium hydroxide as a 10% aqueous solution and the solution is extracted with three portions (200 parts each) of benzene. It is then reacidified with 1.89 parts of nitric acid and is heated on a steam bath for 1 hour to remove any residual benzene. A further titration of a 0.0428% aliquot requires 0.1975 meq. of silver nitrate to the endpoint, which indicates a 92% conversion to the betaine, that is, to 1-carboxymethyl-2-methyl-5-vinylpyridinium betaine. It is a monomer which is useful, for instance, in forming homopolymers and copolymers as described by way of illustration in examples which follow.

1-carboxymethyl-2-methyl-5-vinylpyridinium betaine likewise can be produced by similarly reacting the sodium salt of chloroacetic acid with 2-methyl-5-vinylpyridine, using temperatures above room temperature, if necessary, in order to accelerate the reaction.

EXAMPLE 2

*Preparation of 1-carboxyethyl-2-methyl-5-vinylpyridinium betaine*

To a flask equipped as in Example 1 are added 30.6 parts of beta-bromopropionic acid and 100 parts of water. To this are added, at a temperature of 10–15° C., 8 parts of sodium hydroxide as a 10% aqueous solution. The final pH of this solution is 8.6. To this solution are then added 47.6 parts of 2-methyl-5-vinylpyridine and 80 parts of acetone. The solution is allowed to stand at room temperature and the bromide content is determined at various intervals. After standing at room temperature for a total of 8 days a 1% aliquot requires 1.895 meq. of silver nitrate to the Mohr endpoint, indicating that the reaction is 94.8% complete. The remaining solution is stripped of acetone on the steam bath, cooled and made alkaline by the addition of 1.5 parts of sodium hydroxide as a 10% solution. The solution is then extracted with three 80-part portions of benzene. The residual benzene is evaporated off on a steam bath. The pH is adjusted to 4.0 by the addition of 1.26 parts of nitric acid.

The product, 1-carboxyethyl-2-methyl-5-vinylpyridinium betaine, and which may be designated more specifically as 1-carboxyethyl-2-methyl-5-vinylpyridinium gammaine, is diluted with water to form a 10% aqueous solution thereof. This solution is useful in, for instance, the production of copolymers as described in certain of the examples which follow.

1-carboxyethyl-2-methyl-5-vinylpyridinium betaine can be produced by similarly reacting the sodium salt of betachloropropionic acid with 2-methyl-5-vinylpyridine, using temperatures above room temperature, if necessary, in order to accelerate the reaction.

EXAMPLE 3

*Preparation of 1-carboxymethyl-2-vinylpyridinium betaine*

The same quantities and conditions are employed in this example as in Example 1 with the exception that 105 parts of 2-vinylpyridine are used instead of 119 parts of 2-methyl-5-vinylpyridine. As in the previous cases a good conversion to the product, 1-carboxymethyl-2-vinylpyridinium betaine, is obtained.

Other vinylpyridinium betaines embraced by Formula I can be produced in a manner similar to that described in the preceding examples, using amounts of the appropriate vinylpyridine embraced by Formula II and of the alkali-metal salt of the appropriate halogenated monocarboxylic acid embraced by Formula III that are equivalent to the amounts used in the above examples for the corresponding reactants.

EXAMPLE 4

*Homopolymer of 1-carboxymethyl-2-methyl-5-vinylpyridinium betaine*

To a reaction vessel are added 2 parts of 1-carboxymethyl-2-methyl-5-vinylpyridinium betaine, 18 parts of water and 0.04 part of ammonium persulfate. The solution is heated on a steam bath for 16 hours and is then evaporated to dryness in a shallow vessel. An amber-colored, resinous polymeric film of 1-carboxymethyl-2-methyl-5-vinylpyridinium betaine remains adhering to the glass.

EXAMPLE 5

This example illustrates the preparation of homopolymeric acrylonitrile, which is subsequently employed in comparative dye tests with some of the copolymers of the present invention.

A reaction vessel, equipped with a stirrer, reflux condenser, thermometer and gas-inlet tube, is placed in a constant-temperature bath which is maintained at 35° C. To the vessel is added a solution of 53.0 parts of acrylonitrile, 900 parts of distilled water and 0.29 part of sulfuric acid. The pH of the initial solution is 3.1. A rapid stream of pre-purified nitrogen is passed over the surface of the solution for 30 minutes. The nitrogen flow is then reduced to about one bubble per second. A reduction-oxidation catalyst system ("redox" system) consisting of 1.71 parts of ammonium persulfate and 0.71 part of sodium metabisulfite, each dissolved in 50 parts of water, is then added. The solution first becomes cloudy at the end of 3 minutes, and the polymerization is fairly exothermic for the first half hour. The polymerization is continued for a total of 4 hours at 35° C. The polymer is collected on a Büchner funnel, and washed with 1000 parts of distilled water followed by about 160 parts of methanol. The polymer is dried in an oven at 70° C. for about 16 hours. The yield of dry polyacrylonitrile, which is white, amounts to 48 parts.

The following examples illustrate the preparation of various copolymers of the present invention.

EXAMPLE 6

To a reaction vessel are added 9 parts of acrylonitrile, 1 part of 1-carboxymethyl-2-methyl-5-vinylpyridinium betaine, 90 parts of water and 0.5 part of ammonium persulfate. The solution is warmed on a steam bath for 1 hour. The precipitate is collected on a Büchner funnel, washed with 500 parts of water and dried in an oven at 70° C. for 6 hours. A good yield of dry, white copolymer of acrylonitrile and 1-carboxymethyl-2-methyl-5-vinyl pyridinium betaine is obtained.

EXAMPLE 7

To a reaction flask equipped as in Example 5 is added a solution of 90 parts of acrylonitrile, 8 parts of 1-carboxymethyl-2-methyl-5-vinylpyridinium betaine (as a 10% aqueous solution), 8 parts of vinyl acetate, 875 parts of demineralized water and 0.17 part of nitric acid. The percentage proportions of comonomers are 84.9% acrylonitrile, 7.55% 1-carboxymethyl-2-methyl-5-vinylpyridinium betaine and 7.55% vinyl acetate. The pH of the solution is 3.2. A rapid stream of pre-purified nitrogen gas is passed over the surface of the solution for 30 minutes. The nitrogen flow is then reduced to about one bubble per second. A reduction-oxidation catalyst system ("redox" system) is prepared by dissolving 0.440 part of sodium chlorate and 1.575 parts of sodium sulfite in 100 parts of water and 1.134 parts of nitric acid in another 100 parts of water. Portions of the catalyst solutions are added at 25-minute intervals over a period of 2.5 hours. The polymerization is continued for a total of 4 hours at 40° C. The polymer is collected on a Büchner funnel, washed with 3000 parts of water and dried in an oven at 70° C. for 5 hours. The yield of dry, white tripolymer of acrylonitrile, 1-carboxymethyl-2-methyl-5-vinylpyridium betaine and vinyl acetate amounts to 84 parts.

EXAMPLE 8

This example is essentially the same as Example 7 with the exception that 95.4 parts of acrylonitrile are used instead of 90 parts, 5.3 parts of 1-carboxymethyl-2-methyl-5-vinylpyridinium betaine are used instead of 8.0 parts, and 5.3 parts of vinyl acetate are used instead of 8.0 parts. The percentage proportions of comonomers are 90% acrylonitrile, 5% 1-carboxymethyl-2-methyl-5-vinylpyridinium betaine and 5% vinyl acetate. The yield of dry, white tripolymer of acrylonitrile, 1-carboxymethyl-2-methyl-5-vinylpyridinium betaine and vinyl acetate amounts to 91 parts.

EXAMPLE 9

Example 7 is again repeated with the exception that 95.4 parts of acrylonitrile are used instead of 90 parts, 3.2 parts of 1-carboxymethyl-2-methyl-5-vinylpyridinium betaine are used instead of 8 parts, and 7.4 parts of vinyl acetate are used instead of 8 parts. The percentage proportions of comonomers are 90.0% acrylonitrile, 3.02% 1-carboxymethyl-2-methyl-5-vinylpyridinium betaine and 6.98% vinyl acetate. The yield of tripolymer of acrylonitrile, 1-carboxymethyl-2-methyl-5-vinylpyridinium betaine and vinyl acetate amounts to 87 parts.

EXAMPLE 10

To a reaction vessel equipped as in Example 5 is added a solution of 95.4 parts of acrylonitrile, 5.3 parts of 1-carboxyethyl-2-methyl-5-vinylpyridinium betaine (as a 10% aqueous solution), 5.3 parts of acrylamide, 1050 parts of water and 10.6 parts of sodium nitrate. The percentage proportions of comonomers are 90% acrylonitrile, 5% 1-carboxyethyl-2-methyl-5-vinylpyridinium betaine and 5% acrylamide. The redox catalyst system is prepared in the same manner as before, using 0.88 part of sodium chlorate, 3.15 parts of sodium sulfite and 2.27 parts of nitric acid. The same polymerization conditions are used as described in Example 5. The yield of dry, white tripolymer of acrylonitrile, 1-carboxyethyl-2-methyl-5-vinylpyridinium betaine and acrylamide amounts to 95 parts.

EXAMPLE 11

To a reaction vessel are charged 6 parts of acrylonitrile, 2 parts of 1-carboxymethyl-2-vinylpyridinium betaine, 32 parts of water and 0.08 part of potassium persulfate. The solution is heated on a steam bath for 1 hour. The precipitate is collected on a Büchner funnel, washed with 500 parts of water and dried in an oven at 70° C. for about 3 hours. A good yield of dry, white copolymer of acrylonitrile and 1-carboxymethyl-2-vinylpyridinium betaine is obtained.

EXAMPLE 12

To a reaction vessel are charged 9 parts of styrene, 1 part of 1-carboxymethyl-2-methyl-5-vinylpyridinium betaine, 30 parts of water, 0.30 part of a cationic emulsifying agent, specifically gamma-stearamidopropyldimethyl-beta-hydroxyethylammonium chloride, and 0.10 part of alpha, alpha'-azodiisobutyronitrile. The emulsion is heated on a steam bath 2 hours. At the end of this time the emulsion is broken and the precipitated copolymer is collected, washed and dried in the same manner as in Example 11. A good yield of dry, white copolymer of styrene and 1-carboxymethyl-2-methyl-5-vinylpyridinium betaine is obtained.

Instead of the styrene employed in this example, one can use an equivalent amount of, for example, paramethyl styrene, alpha, para-dimethyl styrene, any of the nuclearly substituted dialkyl styrenes, the various chloro- and cyano-substituted styrenes, vinyl naphthalene and other compounds which are different from the unsaturated betaine, are copolymerizable therewith and contain a $CH_2=C<$ grouping, more particularly a single $CH_2=C<$ grouping.

Emulsions or latices of the copolymer of this example are useful as a component of wall paints, adhesives, and coating and/or impregnating compositions. Such emulsions or latices also can be employed directly for the preparation of various sheets, coatings and elastomeric articles.

EXAMPLE 13

To a reaction vessel equipped with a reflux condenser are charged 9 parts of methyl acrylate, 1 part of 1-carboxyethyl-2-methyl-5-vinylpyridinium betaine, 40 parts of water and 0.1 part of potassium persulfate. The solution is refluxed for 1 hour on a steam bath. The product is collected on a Büchner funnel, washed with 250 parts of water and dried in an oven at 70° C. for 3 hours. A good yield of a cream-colored, rubbery copolymer of methyl acrylate and 1-carboxyethyl-2-methyl-5-vinylpyridinium betaine is obtained.

EXAMPLE 14

A reaction vessel is equipped with a stirrer, a reflux condenser, a thermometer, a gas-inlet tube, and three dropping funnels. Funnel A is charged with a mixture containing 80 parts of acrylamide, 91 parts of a 20% aqueous solution of 1-carboxymethyl-2-methyl-5-vinylpyridinium betaine and 230 parts of water. This monomeric mixture is adjusted to a pH of 2.5 with a few drops of 6 N sulfuric acid. Funnel B is charged with 0.20 part of ammonium persulfate dissolved in 50 parts of water. Funnel C is charged with 0.1 part of potassium meta-bisulfite dissolved in 50 parts of water. The reaction vessel is purged with nitrogen for one hour prior to the start of the copolymerization. The copolymerization is carried out under a nitrogen blanket maintained by introducing a slow, continuous stream of nitrogen into the reaction vessel.

Initially, 20% of the contents of each funnel is added to the reaction vessel with stirring, the constant temperature bath in which the vessel is immersed being held at 40° C. A definite exotherm is experienced but is readily controlled by cooling. Over the next two hours, the contents of the three funnels are added to the vessel in constant ratio and in small increments, at regular intervals. The temperature of the copolymerization is maintained at 40° C. during this period and for three and one-half hours following the last addition. At this point, 500 ml. of water is added, with vigorous stirring. The resulting 10% solution of the copolymer of acrylamide and 1-carboxymethyl-2-methyl-5-vinylpyridinium betaine is useful, for instance, as a textile-treating composition or as a component of such compositions. For example, it can be employed in treating wool-containing fabrics and other textiles to impart shrinkage resistance thereto. The formaldehyde- and other aldehyde-reaction products are similarly useful.

The aqueous copolymer solution of this example, and solutions of their aldehyde-reaction, specifically formaldehyde-reaction, products are also useful as, for instance: core binders; components of adhesive and laminating compositions; sealing agents; thickeners; as beater additives to pulp in the production of improved papers having, for example, high dry-strength characteristics; as drilling mud additives; etc.

Instead of the acrylamide used in this example one can substitute for all or any part of it an equivalent amount of another monomer (or mixture of monomers in any proportions) which is different from 1-carboxymethyl-2-methyl-5-vinylpyridinium betaine, is copolymerizable therewith and which contains a $CH_2=C<$ grouping, e.g., methacrylamide, ethacrylamide, cyclopentacrylamide, phenylacrylamide, tolylacrylamide, benzylacrylamide, and the various mono- and di-N-substituted acrylamides, including the mono- and di-N-alkyl, -cycloalkyl, -aryl, -alkaryl, -aralkyl and -alkoxyalkyl acrylamides. In some cases it may be desirable to carry out the reaction in a mixture of water and an organic solvent, for instance a 1:1 volume mixture of water and acetone.

Likewise, instead of the betaine employed in this and the other examples relating to the production of homopolymers and copolymers, one can use any other unsaturated betaine of the kind embraced by Formula I.

EXAMPLE 15

Samples of the homopolymeric acrylonitrile of Example 5 and of acrylonitrile copolymers of Examples 6-11 are subjected to the following dye test: A sample (5 parts) of the dry homopolymer or copolymer is added to a dyebath consisting of 500 parts of an aqueous solution containing 0.2 part of sulfuric acid, 1 part of sodium sulfate and 0.2 part of Calcocid Alizarine Blue SAPG (Color Index No. 1054). The dyebath is boiled for 30 minutes after which the polymerization product is filtered off and washed with hot water until the water is free of dye. The acrylonitrile copolymers of Examples 6-11, inclusive, are dyed blue whereas the homopolymeric acrylonitrile of Example 5 fails to absorb any dye. The advantage of modifying an acrylonitrile polymerization product by replacing a part (e.g., from about 1% to about 15% or 20% or more, still more particularly from 2% or 3% to 8% or 10%) of the initial acrylonitrile or other monomer with an unsaturated betaine of the kind embraced by Formula I, thereby to obtain a copolymeric substance of improved dyeability, is therefore quite apparent.

EXAMPLE 16

A copolymer (more particularly a tripolymer) is prepared from 90 parts of acrylonitrile, 3 parts of 1-carboxymethyl-2-methyl-5-vinylpyridinium betaine and 7 parts of vinyl acetate in essentially the same manner described under Example 9 with reference to the production of a copolymer of these same ingredients. This copolymer is dissolved in a concetrated aqueous solution of sodium thiocyanate (about 50% sodium thiocyanate in water) in proportions such as will yield a spinning solution containing about 9.5% of copolymer. This solution is filtered, placed under vacuum and allowed to deaerate for about 72 hours.

The aforementioned spinning solution is formed into a fiber by extruding it through a spinneret, having 40 holes 90 microns in diameter, into a coagulating bath comprising water maintained at a temperature of about 0° C. The spun fiber in gel state is continuously passed over a pair of converging wash rolls while it is advancing in a helical path. The fiber is rinsed with water on the rolls to remove excess thiocyanate. The washed fiber is stretched about 850% while passing through a bath of hot water maintained at a temperature of about 99.5° C., and then is taken up on a bobbin where it is kept in a gelled state by applying a fine spray of water while the fiber is being collected on the bobbin.

Individual swatches of the gelled fiber are bleached by bringing to a boil in 3% aqueous hydrogen peroxide, followed by water washing, then bringing to a boil in 35% nitric acid, and again washing with water. After drying at room temperature, the bleached swatches are dyed in the same manner as described under Example 15. The fibers are dyed blue. In marked contrast, a fiber similarly prepared from homopolymeric acrylonitrile remains colorless when placed in the same dye bath for the same length of time.

It will be understood, of course, by those skilled in the art that our invention is not limited to the specific ingredients named in the above illustrative examples nor to the particular proportions and methods mentioned therein. Variations in starting materials, proportions, methods of preparation, etc., can obviously be made, as has been indicated in the portion of this specification prior to the examples.

Although many of the new copolymers of this invention, especially those containing a substantial proportion of acrylonitrile, are particularly useful in the formation of fibers or filaments which are more amenable to dyeing than homopolymeric acrylonitrile, these and the other copolymers of thet invention also have numerous other applications in the plastics and coating arts. For instance, with or without a filter or other additive, they may be used as molding compositions (or as components of molding compositions) from which molded articles are produced by molding the compositions under heat and pressure, e.g., temperatures of the order of 130° C. or 140° C. to 200° C. and under pressures up to 10,000 pounds or more per square inch. Among the fillers than can be employed in the production of molded compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable and polymerized compositions of our invention can be used in many different applications, for example as adhesives; in the treatment, more particularly coating, of paper or paper stock and in other coating applications; and for various other purposes. The polymer can be formed or advanced in situ after application of the monomer or mixture of monomers, or incompletely polymerized polymer, to the base material to be coated, impregnated or otherwise treated.

The water-soluble polymers are also useful as agents, or as a component of agents, for preventing soil redeposition; and as soil conditioners.

The unoriented and oriented fibers produced from our new fiber-forming copolymers are readily dyed, especially with an acid dye, while the fiber is in either a gel (e.g., aquagel) or a dry state. Such fibers or other shaped articles produced from the copolymers also have, in general, better antistatic properties than polymers in which no unsaturated betaine of the kind embraced by Formula I has been incorporated.

The homopolymeric and copolymeric betaines of this invention are a new and useful class of polyelectrolytes having a wide field of industrial applications, numerous examples of which have been given hereinbefore.

It will be understood, of course, that vinylpyridinium betaines other than those embraced by Formula I can be similarly produced from vinyl pyridines other than those covered by Formula II providing the said vinylpyridines are available. Examples of sub-classes of vinylpyridinium betaines outside of the scope of Formula I that thus might be made are the tri- and the tetra-(lower alkyl) monovinyl 1-carboxyalkylpyridinium betaines.

We claim:

1. A product comprising a copolymer of more than two comonomers, one of which is (a) acrylonitrile, (b) another of which is a betaine selected from the class consisting of 1-carboxymethyl-2-methyl-5-vinylpyridinium betaine and 1-carboxyethyl-2-methyl-5-vinylpyridinium betaine, and (c) at least one additional comonomer selected from the class consisting of vinyl acetate and acrylamide, the ingredients of (a), (b) and (c) being present in the unpolymerized mixture of monomers within the following ranges of percentage proportions by weight: acrylonitrile of (a) 84.9–90.0%; betaine of (b), 3.0–7.55%; and comonomer of (c), 5.0–7.55%, the sum of the ingredients of (a), (b) and (c) totaling 100.0%.

2. A product comprising a copolymer of more than two comonomers, one of which is (a) acrylonitrile, (b) another of which is 1-carboxymethyl-2-methyl-5-vinylpyridinium betaine, and (c) another of which is vinyl acetate, the ingredients of (a), (b), and (c) being present in the unpolymerized mixture of monomers within the following ranges of percentage proportions by weight: acrylonitrile of (a), 84.9–90.0%; betaine of (b), 3.0–7.55%; and vinyl acetate of (c), 5.0–7.55%, the sum of the ingredients of (a), (b), and (c) totaling 100.0%.

3. A product comprising a copolymer of a mixture of comonomers consisting of, by weight, 90% acrylonitrile, 5% 1-carboxyethyl-2-methyl-5-vinylpyridinium betaine and 5% acrylamide.

References Cited in the file of this patent

UNITED STATES PATENTS

| | | |
|---|---|---|
| 2,082,275 | Daimler et al. | June 1, 1937 |
| 2,487,829 | Richards | Nov. 15, 1949 |
| 2,563,289 | Steinman | Aug. 7, 1951 |
| 2,717,834 | Saner | Sept. 13, 1955 |
| 2,744,130 | Wineberg | May 1, 1956 |
| 2,746,943 | Pritchard | May 22, 1956 |
| 2,771,462 | Shen | Nov. 20, 1956 |
| 2,895,949 | Thomas | July 21, 1959 |

OTHER REFERENCES

Whitmore: Organic Chemistry, p. 594, Van Nostrand (1937).

Bezzi: C. A. 33 p. 6311 (1931), Gresham, J. Am. Chem. Soc. 73, 3168–71 (1951), abstract in C.A. 46, pp. 1445–1447 (1952).

Rasmussen: J. Am. Chem. Soc., 71, 1073–9 (1949).

Edsall: J. Am. Chem. Soc., 57, 1964–5 (1935).

"Organic Chemistry," by Karrer (1938 ed.), p. 268.

UNITED STATES PATENT OFFICE
CERTIFICATE OF CORRECTION

Patent No. 2,977,341                                March 28, 1961

Walter H. Schuller et al.

It is hereby certified that error appears in the above numbered patent requiring correction and that the said Letters Patent should read as corrected below.

Column 4, line 27, for "cane" read -- can --; line 35, for "Illustrating" read -- Illustrative --; column 5, line 25, for "catlayst" read -- catalyst --; column 6, line 13, for "aplications" read -- applications --; line 50, for "arcrylic" read -- acrylic --; column 11, line 60, for "cyclopentacrylamide" read -- cyclopentylacrylamide --; column 12, line 69, for "thet" read -- the --; line 71, for "filter" read -- filler --.

(SEAL)       Signed and sealed this 17th day of October 1961.

Attest:

ERNEST W. SWIDER                               DAVID L. LADD
Attesting Officer                                        Commissioner of Patents

USCOMM-DC